(12) United States Patent
Raghunandan

(10) Patent No.: US 6,775,689 B1
(45) Date of Patent: *Aug. 10, 2004

(54) SYSTEM FOR RESTRUCTURING SELECTED PARTS OF EMAIL MESSAGES PRIOR TO TRANSMISSION TO PLURALITY OF RECIPIENTS

(75) Inventor: Hulikunta Prahlad Raghunandan, Karnataka (IN)

(73) Assignee: International Business Machines Corporation, Armonk, NY (US)

(*) Notice: Subject to any disclaimer, the term of this patent is extended or adjusted under 35 U.S.C. 154(b) by 574 days.

This patent is subject to a terminal disclaimer.

(21) Appl. No.: 09/588,951

(22) Filed: Jun. 7, 2000

(51) Int. Cl.⁷ .............................................. G06F 15/16
(52) U.S. Cl. ....................... 709/206; 709/204; 709/205; 709/207; 709/232; 709/246
(58) Field of Search ................................ 709/204–207, 709/232, 246

(56) References Cited

U.S. PATENT DOCUMENTS

| | | | | |
|---|---|---|---|---|
| 5,864,684 A | * | 1/1999 | Nielsen | 709/206 |
| 5,893,914 A | * | 4/1999 | Clapp | 715/507 |
| 6,044,395 A | * | 3/2000 | Costales et al. | 709/206 |
| 6,061,698 A | * | 5/2000 | Chadha et al. | 715/513 |
| 6,101,532 A | * | 8/2000 | Horibe et al. | 709/206 |
| 6,246,992 B1 | * | 6/2001 | Brown | 705/2 |
| 6,332,156 B1 | * | 12/2001 | Cho et al. | 709/206 |
| 6,389,475 B1 | * | 5/2002 | Speakman et al. | 709/232 |
| 6,424,996 B1 | * | 7/2002 | Killcommons et al. | 709/206 |
| 6,476,930 B1 | * | 11/2002 | Roberts et al. | 358/1.18 |
| 6,496,853 B1 | * | 12/2002 | Klein | 709/206 |
| 6,507,865 B1 | * | 1/2003 | Hanson et al. | 709/206 |
| 2002/0099777 A1 | * | 7/2002 | Gupta et al. | 709/206 |
| 2002/0188683 A1 | * | 12/2002 | Lytle | 709/206 |
| 2003/0088704 A1 | * | 5/2003 | Mertama et al. | 709/246 |

OTHER PUBLICATIONS

Raghunandan, "System for Directing E-mail to Selected Recipients," IBM Patent Application No. 09/589,140, filed Jun. 7, 2000, Atty. Docket No. JP920000122US1, including Reply B amending claims.

* cited by examiner

*Primary Examiner*—Nabil El-Hady
(74) *Attorney, Agent, or Firm*—Manny Schecter; T. Rao Cora; Anthony V S England

(57) ABSTRACT

This invention relates to a method, apparatus and program product for restructuring email messages for transmission to a plurality of recipients by providing transmission control directives and email content segment identifiers supplied by the user, parsing the said directives and email contents, expanding aliases wherever necessary and applying the said directives to restructure the email contents by sending selected segments to selected recipients in identified lists. This invention further includes reordering the selected segments in a defined sequence prior to transmission. This invention also includes merging of selected identified corresponding segments from a plurality of email messages and transmitted to selected recipients in identified recipient lists. The selected merged segments may further be reordered in a defined sequence prior to transmission.

19 Claims, 6 Drawing Sheets

SYSTEM FOR RESTRUCTURING SELECTED PARTS OF EMAIL MESSAGES PRIOR TO TRANSMISSION TO PLURALITY OF RECIPIENTS

FIELD OF THE INVENTION

This invention relates to a system for restructuring selected parts of email messages prior to transmission to plurality of recipients. More particularly, this invention relates to a system for reordering, merging selected parts of email messages, the actions being performed individually or collectively to structure the email in a desired manner prior to transmitting to a plurality of recipients.

BACKGROUND OF THE INVENTION

Electronic mail provides a quick and convenient way for computer users to communicate. This communication is initiated by a message sender who composes the message using a text editing program, provides the e-mail address of the intended recipient, and often provides an indication of the content (subject matter) of the message by providing text in a "subject" field. Using well-understood technology this composed message is then sent to the recipient's computer address. The recipient's computer receives the message and stores it in the recipient's inbox. The recipient eventually reads, deletes, responds to, or otherwise processes the message stored within the inbox by using any of a number of email programs well known in the art.

The header portion of an email message contains fields composed of character strings comprising a field-name followed by a colon, followed by a field-body terminated by a carriage return/line feed. An example header field is:

"To: John Doe<CR><LF>".

In this example, the <CR> represents the ASCII carriage return character and the <LF> represents the ASCII line feed character. The header filed-names are not case sensitive, thus, "to:" is equivalent to "TO:" or "tO:".

The contents of these headers are specified by the entity that composes the message.

The "To:" field-body contains the addresses of the primary recipients of the message where the address of each recipient is separated by a comma. Recipients include both humans and programs. The "Subject:" field-body often provides a summary, or indicates the nature, of the message and sometimes contains a specialized command string that is to be recognized by the recipient. Although, these fields are all initialized by the sender, the recipient fields are generally limited to actual Internet addresses. On the other hand, the subject field has no specific meaning and may, in fact, be blank, contain a specialized command string or contain a random arrangement of characters. Additional "cc:" and "bcc:" field bodies are optional means for sending declared and undeclared ('blind') copies of the message to one recipient or groups of recipients.

A sender can address a single message to many recipients by separating the addresses of the recipients with a comma. Each of these recipients may respond to the original message by sending a reply message to the same list of recipients (plus the original sender). Some of these recipients may then respond to the first reply message. These reply messages are termed follow-up messages to the original message. This process facilitates a vigorous discussion between the original sender and the recipients, as well as between the recipients.

Very often, a recipient or group of recipients who are frequently contacted, are identified by an alias (a name string) in order to facilitate identification and/or reduce the burden of repeatedly entering the individual email addresses. An alias may correspond to a group of email addresses and may further make reference to other aliases. In this manner a complex hierarchy of aliases can be established.

With e-biz coming of age and the internet usage increasing in exponential proportion there is a severe need to supplement e-mail tools with powerful facilities so as to enable optimal utilization of internet bandwidth with ease of use. E-mail usage is also likely to increase exponentially. While all efforts are being made to develop and provide appropriate internet infrastructure, concerted efforts are needed to optimize e-mail usage and there is a dire need to improve the current facilities.

For example, existing email systems do not provide facilities for selective transmission or receiving of email. U.S. Pat. No. 5,864,684 describes an invention for enabling a user to exclude himself from subscription to a mailing list either temporarily or permanently. In other words, this patent implements subscription and unsubscription to automatic mailing lists. This patent does not address the problem of selective transmission of an email message to a number of recipients.

Our co-pending application Ser. No. 09/589,140, filed Jun. 7, 2000, System for Directing E-mail to Selected Recipients, addresses the problem mentioned above by providing a solution for transmitting email to selected recipients. The existing email systems do not provide any means to selectively alter lists of recipients as needed. This results in the user having to either manually enter a large number of recipient aliases and/or email addresses or alternatively the email is transmitted to everyone in the list resulting in wasted bandwidth and confusion.

However, there is still a need to provide other facilities, such as, the ability to send selected parts of email contents to selected recipients, the ability to reorder email contents prior to transmitting to selected recipients, the ability to merge email segments received from a plurality of senders prior to replying

THE OBJECT AND SUMMARY OF THE INVENTION

The object of this invention is therefore to introduce a feature in email software to provide the ability to send selected parts of email contents to selected recipients.

The second object of the invention is to provide a facility for reordering email contents prior to transmitting to selected recipients.

Further objective of the invention is to provide the ability to merge selected email segments received from a plurality of senders prior to replying and transmitting to selected recipients.

To achieve said objectives, this invention provides in a computing system, a method for restructuring email messages by transmitting selected parts of the message to a plurality of recipients, characterized in that said method comprising the steps of:

identifying selected email contents by means of segment identifiers, identifying recipients for each of the said selected email contents by means of segment recipient lists, providing transmission control directives for directing the email system to send the selected email contents to the selected recipients in the said recipients lists, parsing said transmission control directives and transmitting the said identified email content segment to recipients in said segment recipient lists, creating an output email message containing identified segments for each recipients, in accordance with rules based on implementation requirements.

The said recipients are identified by one or more aliases.

The directives for sending the messages to selected recipients include directives for excluding or including recipients from one or more aliases.

This invention further provides in a computing system, a method for restructuring email messages by reordering selected parts of the email message prior to transmitting to a plurality of recipients, characterized in that said method comprising the steps of:

identifying selected email contents by means of segment identifiers, identifying recipients for selected email contents arranged in defined order by means of segment recipient lists containing segment ordering lists for each identified recipient or group of recipients, providing transmission control directives for directing the email system to send the selected email contents to the selected recipients in the said recipients lists, after reordering the email segments in the segment order defined for each recipient or group of recipients, parsing said transmission control directives and arranging the said identified email contents in the order given by the said segment ordering lists and transmitting the said ordered segments to the recipients in said segment recipient lists, creating an output email message containing desired segments arranged in the specified order to each recipients, in accordance with rules based on implementation requirements.

The said recipients are identified by one or more aliases.

The directives for sending the messages to selected recipients include directives for excluding or including recipients from one or more aliases.

Furthermore, this invention also provides in a computing system, a method for constructing email messages by merging selected parts from a plurality of received email messages, in defined order, prior to transmitting to a plurality of recipients, identified by recipients lists characterized in that said method comprising the steps of:

identifying selected email contents in each received email message by means of segment identifiers, extracting email contents having corresponding segment identifier from each email message and merging into the output email message in accordance with rules based on implementation requirements, appending contents against each merged email segment, where necessary, providing transmission control directives for directing the email system to send the merged output email message to the selected recipients in the said recipient lists, parsing said transmission control directives and transmitting the merged email contents to the recipients in the said recipient lists, The said output email message contains merged segments that are reordered in a specified sequence.

The said recipients are identified by one or more aliases.

The directives for sending the messages to selected recipients include directives for excluding or including recipients from one or more aliases.

Another aspect of the instant invention is an email transmission apparatus configured to transmit email messages to selected recipients and groups of recipients from identified list or lists of recipients, said apparatus having a central processing unit (CPU), associated memory and storage devices and input and output devices, characterized in that it includes:

an inputting mechanism for obtaining identification of email content segments and transmission control directives for sending selective said segments to identified recipients in defined recipient lists, from the user, a parsing mechanism for identifying email content segments and transmission control directives provided by the user, a constructing mechanism for constructing output email messages from the input email message based on the transmission control directives and identified content segments, in accordance with rules based on implementation requirements.

The said inputting mechanism comprising one or more email content segments, one or more email segment transmission directive definition strings, one or more recipient list definition strings that identify one or more recipient lists, one or more aliases and/or email addresses that identify one or more recipients in the said recipient lists.

The said parsing mechanism is any standard parsing means.

The said constructing mechanism comprising means for generating output email messages by selective combination of identified input email segments based on said transmission control directives and identified segments.

Yet another aspect of the present invention is an email transmission apparatus configured to transmit email messages to selected recipients and groups of recipients from identified list or lists of recipients, said apparatus having a central processing unit (CPU), associated memory and storage devices and input and output devices, characterized in that it includes:

an inputting mechanism for obtaining identification of email content segments and transmission control directives for sending selective said segments in defined reordered form to identified recipients in defined recipient lists, from the user, a parsing mechanism for identifying email content segments and transmission control directives provided by the user, a constructing mechanism for constructing output email messages from the input email message based on the transmission control directives and identified content segments, in accordance with rules based on implementation requirements.

The said parsing mechanism is any standard parsing means.

The said constructing mechanism comprising means for generating output email messages by selective combination of identified input email segments based on said transmission control directives and identified segments, in accordance with rules based on implementation requirements.

This invention further relates to an email transmission apparatus configured to transmit email messages to selected recipients and groups of recipients from identified list or lists of recipients, said apparatus having a central processing unit (CPU), associated memory and storage devices and input and output devices, characterized in that it includes:
- an inputting mechanism for obtaining identification of email content segments in multiple input email messages,
- a parsing mechanism for identifying email content segments,
- a constructing mechanism for constructing output email messages by merging similarly identified segments from each of the input email messages into the output email messages, in accordance with rules based on implementation requirements.

The said parsing mechanism is any standard parsing means.

The said constructing mechanism comprising means for generating output email messages by selective combination of identified input email segments based on said transmission control directives and identified segments.

The instant invention also provides a computer program product comprising a computer usable storage medium having computer readable code embodied therein for causing a computer to transmit email to a plurality of recipients, characterized in that it includes:
- computer readable code devices configured to enable identification of selected email contents defined by means of segment identifiers, and identification of recipients for each of the said selected email contents by means of segment recipient lists, by the user,
- computer readable code devices for parsing said transmission control directives to identify transmission requirements,
- computer readable code devices for constructing output email messages containing specified segment content as defined in said transmission control directive, in accordance with rules based on implementation requirements.

The other aspect of the present invention is a computer program product comprising a computer usable storage medium having computer readable code embodied therein for causing a computer to transmit email to a plurality of recipients, characterized in that it includes:
- computer readable code devices configured to enable identification of selected email contents defined by means of segment identifiers, and identification of defined sequence of said segments for recipients or groups of recipients identified by recipient lists, by the user,
- computer readable code devices for parsing said segment identifiers and said recipient lists to identify transmission requirements,
- computer readable code devices for constructing output email message containing the said identified email content segments in said defined sequence to recipients in said recipient lists, in accordance with rules based on implementation requirements.

The present invention also provides a computer program product comprising a computer usable storage medium having computer readable code embodied therein for causing a computer to transmit email to a plurality of recipients, characterized in that it includes:
- computer readable code devices configured to enable identification of selected email contents defined by means of segment identifiers in multiple input email contents, by the user,
- computer readable code devices for parsing said segment identifiers and said recipient lists to identify transmission requirements,
- computer readable code devices for constructing output email messages containing the said identified email content segment by merging contents of identical segment identifiers in said input email messages to provide output email contents, in accordance with rules based on implementation requirements.

BRIEF DESCRIPTION OF THE DRAWINGS

The invention will now be described in general with reference to the accompanying drawings and examples.

DETAILED DESCRIPTION OF THE INVENTION

Figure 1:
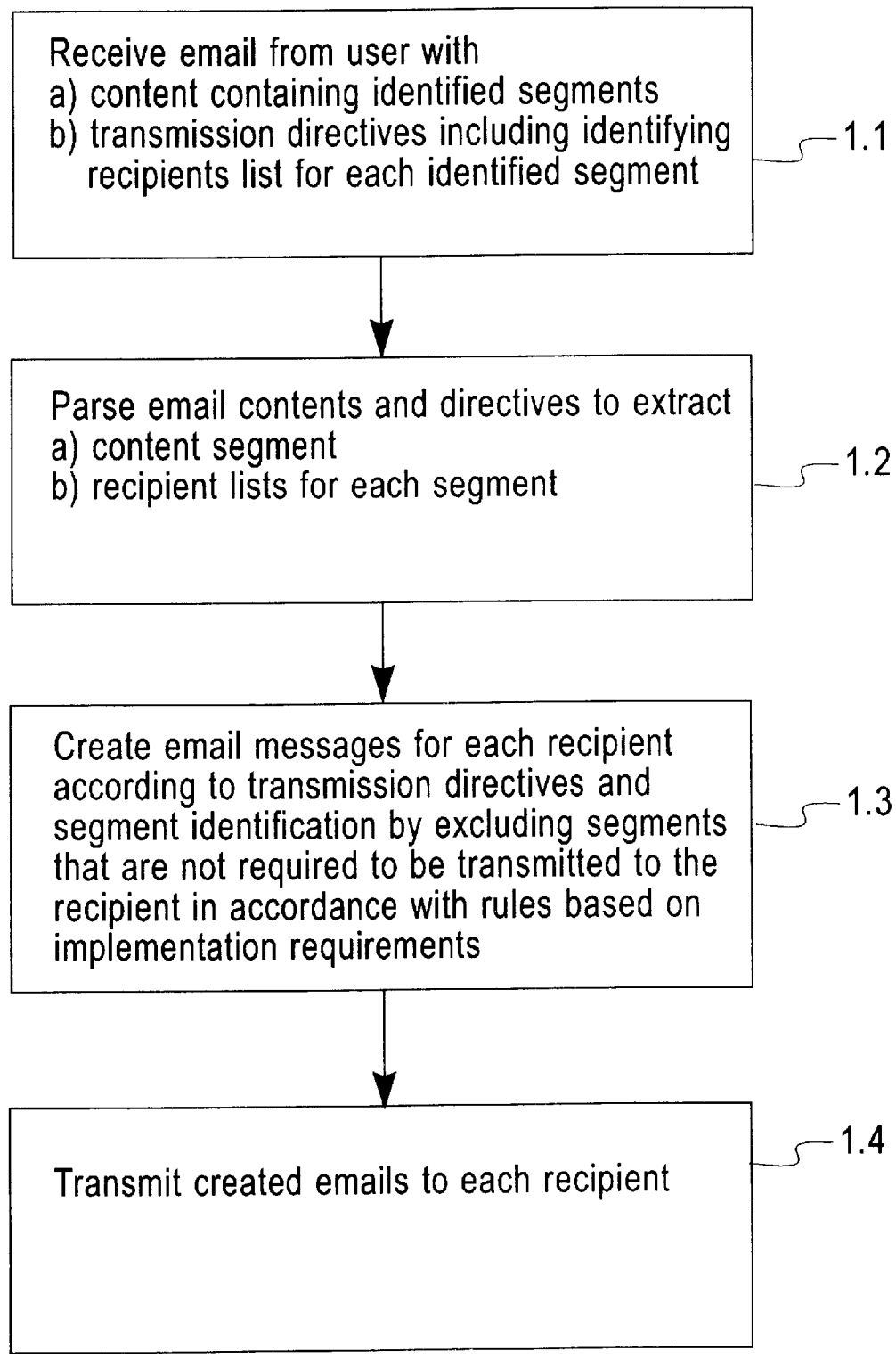
FIG. 1 shows a flow chart describing the method for sending selected segments of an email message to selected recipients.

Referring to FIG. 1, the email system receives the email message from the user, including identified segments in the email contents as well as transmission control directives in the email header, which define identified recipients for each identified segment, as shown in block (1.1). The email system parses the said message to identify each segment as well as the list of recipients for each segment, as shown in block (1.2). The email system then constructs customized email messages for each list of recipients, in accordance with the transmission control directives by excluding those segments, which the recipients are not required to receive, as shown in block (1.3). These directives are applied in accordance with rules based on implementation requirements. The messages thus constructed are then transmitted to each of the recipient in each of the lists, as shown in block (1.4).

Figure 2:
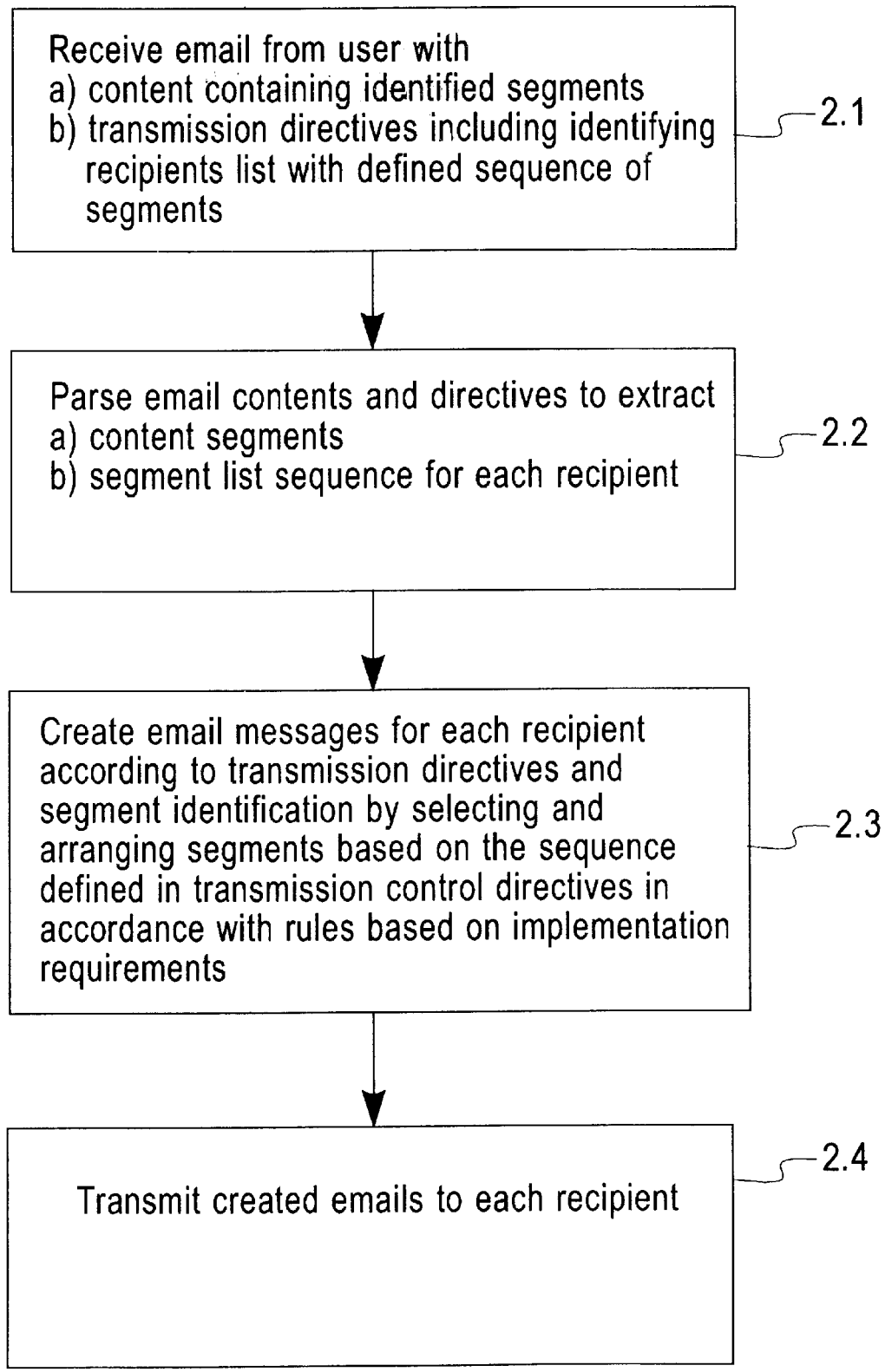
FIG. 2 shows a flow chart describing the method for sending selected segments of an email message to selected recipients with the said segments rearranged in a desired sequence.

FIG. 2 shows the email system, which receives the email message from the user, including identified segments in the email contents as well as transmission control directives in the email header, which define identified segment sequences for each recipient or group of recipients, as shown in block (2.1). The email system parses the said message to identify each segment as well as the segment sequence list for each recipient, as shown in block (2.2). The email system then constructs customized email messages for each recipient or group of recipients by arranging the identified segments in accordance with the sequence listed in the transmission control directive, as shown in block (2.3). These directives are applied in accordance with rules based on implementation requirements. The messages thus constructed are then transmitted to each of the recipient in each of the lists, as shown in block (2.4).

Figure 3:
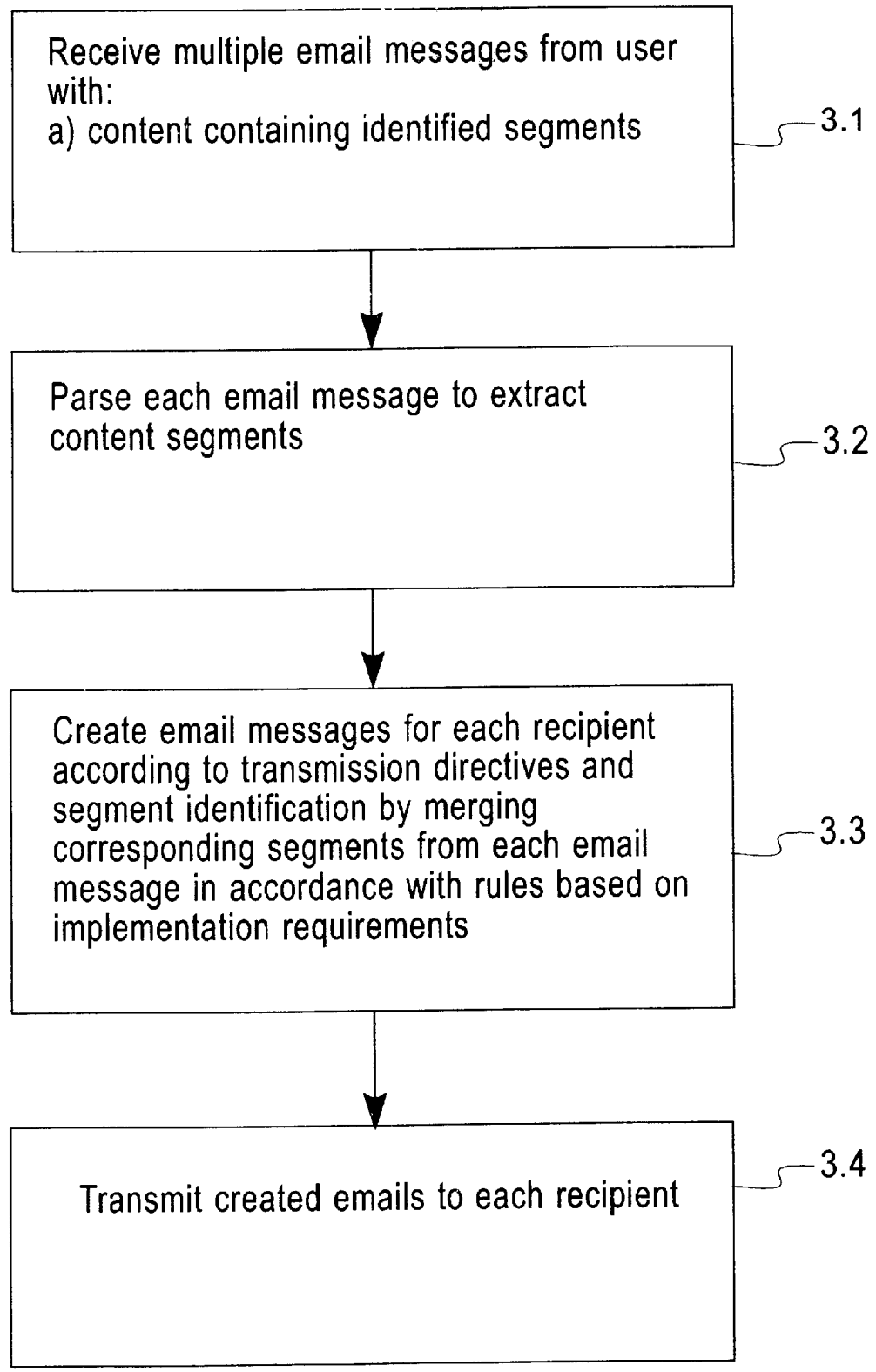
FIG. 3 shows a flow chart describing the method for sending an email message to selected recipients after merging the segmented contents of multiple received email messages.

In FIG. 3 the email system receives multiple email messages, including identified segments in the email contents of each message, as shown in block (3.1). The email system parses the said messages to identify each segment, as shown in block (3.2). The email system then constructs an output customized email message, by merging the identified segments from the input email messages into the output email message, as shown in block (3.3). These directives are applied in accordance with rules based on implementation requirements. The message thus constructed is then transmitted to each of the recipient in each of the lists, as shown in block (3.4).

Figure 4:
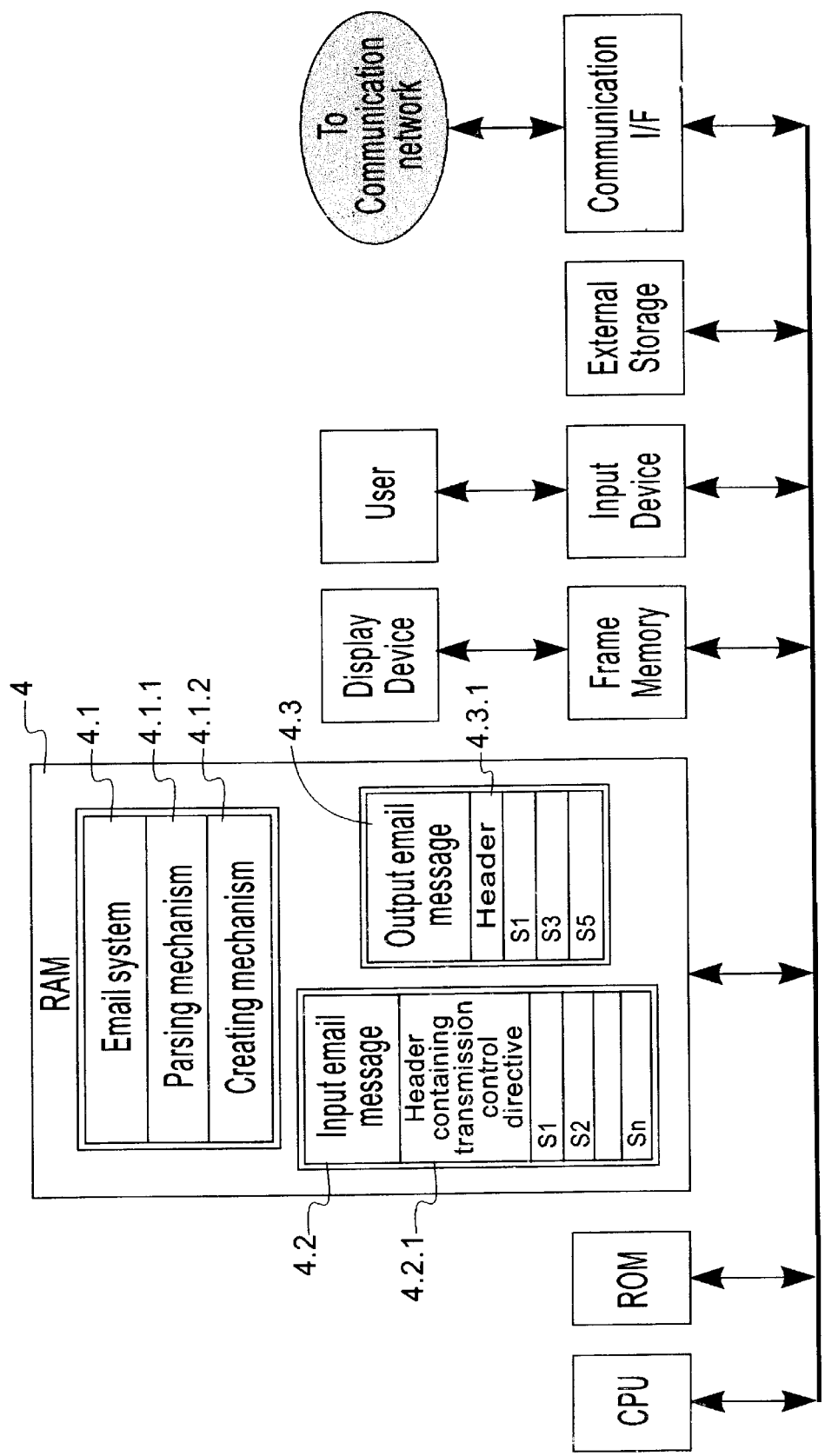
FIG. 4 shows an email transmission apparatus according to this invention for sending selected segments of an email message to selected recipients.

FIG. 4 shows an embodiment of the email transmission apparatus containing an email system (4.1), input email message (4.2) and output email message (4.3) in the RAM (4.0) of the said apparatus. The email system (4.1) contains a parsing mechanism (4.1.1) and creating mechanism (4.1.2) that operate on the input email message, in accordance with the transmission control directives contained in the header (4.2.1) of the input email message, to create the output email message (4.3) containing the desired segments from the input email message.

Figure 5:
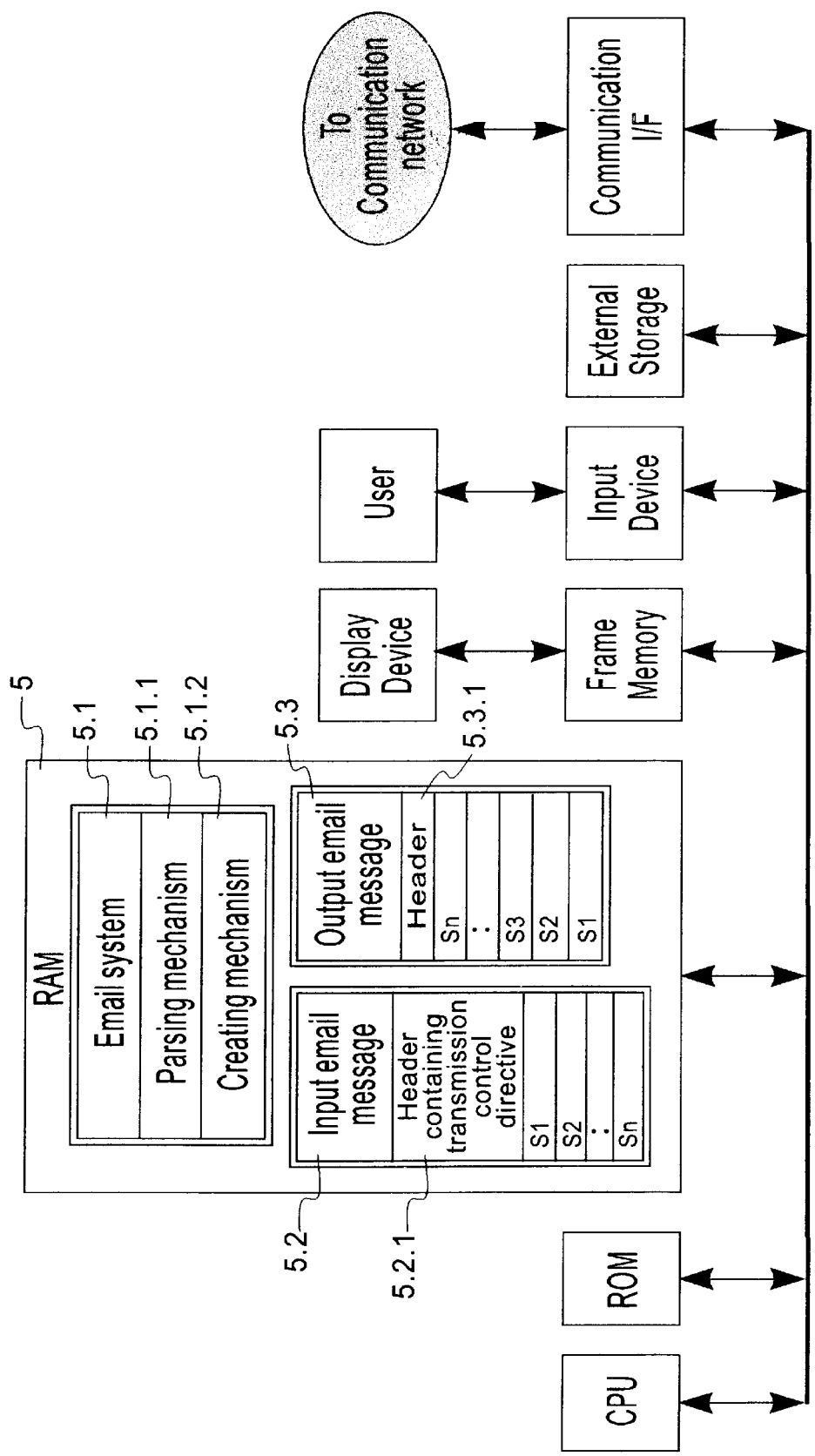
FIG. 5 shows an email transmission apparatus according to this invention for sending selected segments of an email message to selected recipients with the said segments rearranged in a desired sequence.

In FIG. 5 an embodiment of the email transmission apparatus contains an email system (5.1), input email message (5.2) and output email message (5.3) in the RAM (5.0) of the said apparatus. The email system (5.1) containing parsing mechanism (5.1.1) and creating mechanism (5.1.2) operates on the input email message, in accordance with the transmission control directives contained in the header (5.2.1) of the input email message, to create the output email message (5.3) containing the desired segments in the desired order from the input email message.

Figure 6:
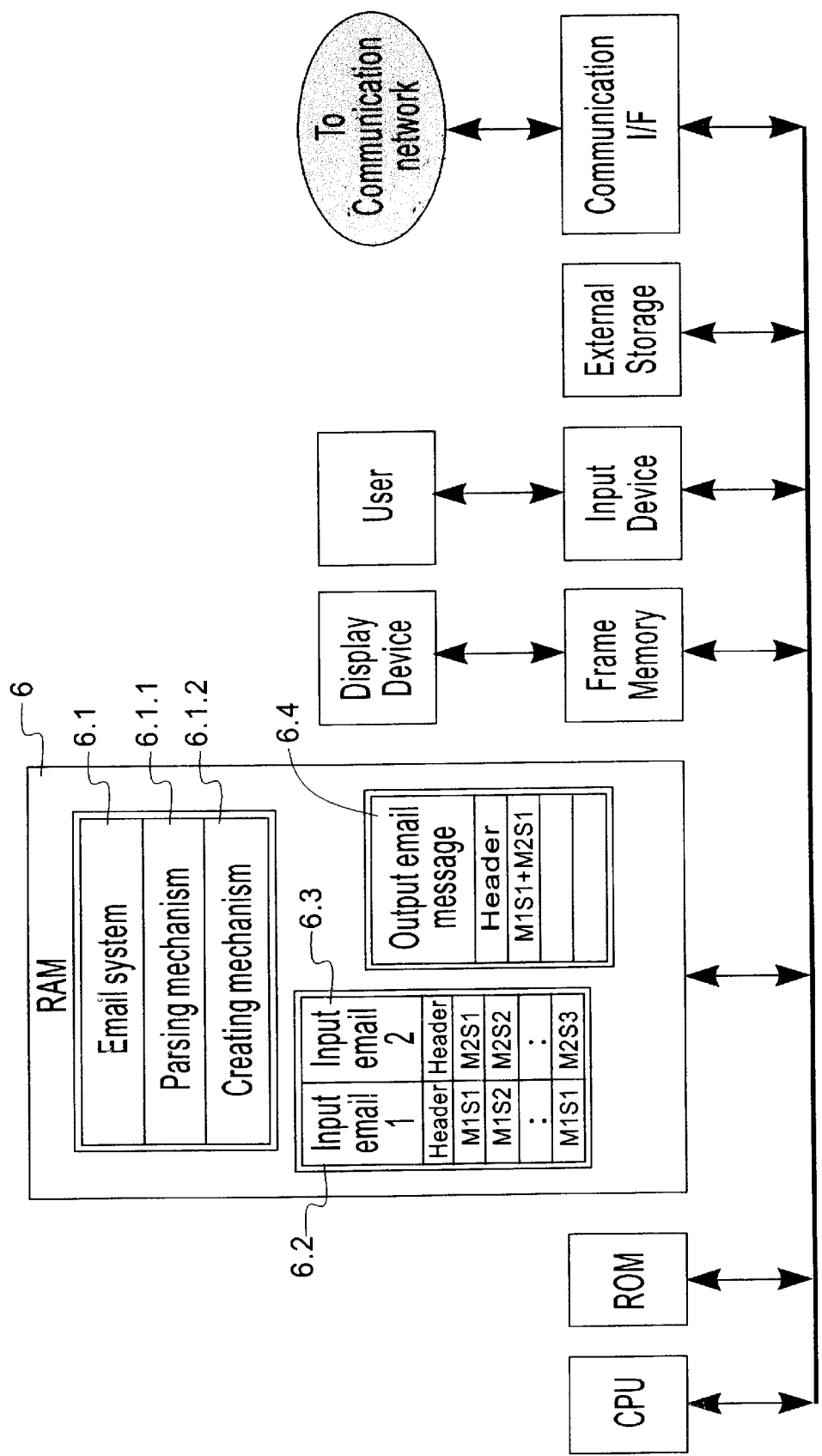
FIG. 6 shows an email transmission apparatus according to this invention for sending an email message to selected recipients after merging the segmented contents of multiple received email messages.

FIG. 6 shows an embodiment of the email transmission apparatus containing an email system (6.1), input email messages (6.2 & 6.3, which could be 'n' number of messages) and output email message (6.4) in the RAM (6.0) of the said apparatus. The email system (6.1) containing parsing mechanism (6.1.1) and creating mechanism (6.1.2) operates on the said input email messages by merging identical segments from each input email message to create the output email message (6.4) containing the merged segments.

EXAMPLE I

Method to Send Selected Parts of Email to Plurality of Recipients

Problem:

While sending e-mail to a host of recipients there is a need to:

1. Deny one or more segments of the mail (e.g. attachments) to a section of the recipients.
2. Post selected segments to selected recipients and/or selected newsgroups.

These features are not available in current e-mail tools.

The Solution, according to this invention is to provide a facility wherein e-mail contents can be segmented and selected segments sent only to appropriate recipients. There are cases where it may not be necessary to transmit all segments of the mail to all recipients even though most segments may need to be sent to them. In such cases it is important to ensure that this objective is met without requiring the user to create separate email messages for each recipient, especially when the number of recipient is large.

This invention suggests a method of achieving this objective, thereby providing the following benefits:

a. Construction of appropriate mails more to the point and suited to the recipient profile.

b. Saving of network bandwidth because several separate mails need not be sent to several recipients only because there is a slight difference in mail contents.

attachments and other e-mail segments are not sent to recipients where they are not mandated.

One possible implementation of the system is given below. Consider,

| E-mail header structure: | |
| --- | --- |
| To | To_list |
| Cc: | Cc_list |
| Bcc: | Bcc_list |
| Group: | Group_list |
| RL1 | List of recipients for segment S1 |
| RL2 | List of recipients for segment S2 |
| RL3 | List of recipients for segment S3 |
| . | . |
| . | . |
| . | . |
| RLn | List of recipients for segment Sn |
| E-mail body structure: | |
| S1 | Segment 1 contents |
| S2 | Segment 2 contents |
| S3 | Segment 3 contents |
| . | . |
| . | . |
| . | . |
| Sn | Segment n contents |

Where:

1. To:, Cc:, Bcc: and Groups are the standard e-mail fields. These fields relate to the whole e-mail and not segments.
2. RL1 to RLn in the e-mail header structure are the recipient list indicators for each email segment lists. Recipient lists can include aliases, e-mail addresses and/or newsgroups. The e-mail body structure contains segment contents for each segment identified by segment identifiers S1 . . . Sn.
3. As per the invention.

The recipients list in RL1 receive Segment 1 contents only.

The recipients list in RL2 receive Segment 2 contents only.

:

:

The recipients list in RLn receive Segment n contents only.

Implementation Details

To implement this system, the algorithm of an existing email system can be suitably modified to:

a. include new fields in the e-mail header structure for identifying recipient lists RL1, RL2, RL3, . . . RLn for each segment in the email context b. Include new fields S1, S2, S3 . . . Sn in the e-mail body structure to associate text/attachments with each segment. The number of segments of the e-mail would only be limited by OS or hardware limitations.

EXAMPLE II

Method to Reorder E-mail Segments While Transmitting to a Plurality of Recipients With an increase in e-mail usage there is a need to add powerful features to e-mail tools.

Problem:

While sending e-mail to a host of recipients there is a need to reorder the contents of the e-mail segments depending on the recipient profile Consider the case where a technical report needs to be sent to a. A technical review team to review technology 1
b. A technical review team to review technology 2
c. A technical review team to review technology 3

Consider the technical report to contain the following structure a. Title
b. Abstract
c. Executive Summary
d. Introduction
e. Technical Section 1—covering technology 1
f Summary of technical section 1
g. Technical Section 2—covering technology 2
h. Summary of technical section 2
i. Technical Section 2—covering technology 3
j. Summary of technical section 3
k. Findings
l. Conclusions
m. Recommendations Typically one would want to send the sections in the technical report in the following way to various recipients instead of sending the whole report.

| No. | Desirable Sections in the Report with preferred order | Recipient | Comments |
|---|---|---|---|
| 1. | Title<br>Abstract<br>Technical Section 1 - covering technology 1<br>Summary of technical section 1<br>Summary of technical section 2<br>Summary of technical section 3<br>Findings<br>Conclusions<br>Recommendations | A technical review team to review technology 1 | Some sections have been simply remove but the order has not changed. |
| 2. | Title<br>Abstract<br>Technical Section 2 - covering technology 2<br>Summary of technical section 2<br>Summary of technical section 1<br>Summary of technical section 3<br>Findings<br>Conclusions<br>Recommendations | A technical review team to review technology 2 | The order of 'Summary of technical sections 2 and 1' have been interchanged. |
| 3. | Title<br>Abstract<br>Technical Section 3 - covering technology 3<br>Summary of technical section 3<br>Summary of technical section 1<br>Summary of technical section 2<br>Findings<br>Conclusions<br>Recommendations | A technical review team to review technology 3 | The order of 'Summary of technical sections 3, 2 and 1' have been interchanged. |

These features are not available in current e-mail tools. The e.g. illustrated above is only indicative of a large type of similar requests where the same e-mail contents need to be reordered for varying recipient profiles.

Solution, according to this invention:

This invention fulfills the above mentioned requirements by providing a facility wherein e-mail contents can be segmented, and reordered based on recipient profile before transmitting the same to recipients.

Following benefits are likely to be accrued:

a. Constructing appropriate mails more to the point and suited to the recipient profile especially when you have to choose from various recipients who are part of a complex alias hierarchy.
b. Network bandwidth is saved because several separate mails need not be sent to several recipients only because there is a slight difference in e-mail segment ordering One possible implementation of this system uses the following proposes email structure:

| E-mail header structure: | |
|---|---|
| To: | Alias1(S2, S1, S3, . . . Sn) Alias12 |
| Cc: | Alias2(S3, S2, S1, . . . Sn) Alias21 Alias211(S3, S1) |
| Bcc: | Bcc_list(S1, Sn, S2, . . . S3) |
| Group: | Group_list(Sn, . . . , S3, S2, S1) |
| E-mail body structure: | |
| S1 | Segment 1 contents |
| S2 | Segment 2 contents |
| S3 | Segment 3 contents |
| . | . |
| . | . |
| . | . |
| Sn | Segment n contents |

Description of Headers and Fields in the Above Example

1. To: field includes recipients listed in Alias1 and e-mail is to be sent with segment ordering mentioned as S2, S1, S3, . . . Sn. Members of Alias12 are to be excluded.
2. Cc: field includes recipients listed in Alias2 e-mail is to be sent with segment ordering mentioned as S3, S2, S1, . . . Sn. Members of Alias21 are to be excluded. Members of Alias211 are to be included who need to be sent e-mail with segment ordering mentioned as S3,S1. This means that only two segments are to be transmitted to Alias211.
3. Bcc: field includes recipients listed in Bcc_list with segment ordering of e-mail being S1,Sn,S2, . . . ,S3.
4. Group: field includes recipients listed in Group_list with segment ordering of e-mail being Sn, . . . ,S3,S2, S1.
5. The e-mail body structure contains segment contents for each segment.
6. The order of the segments is mentioned in parentheses followed by the aliases.
7. The precedence would be left to right and top to bottom.

Implementation Details:

To implement the system, the algorithm of an existing email system can be suitably modified to:

a. change the To:, Cc:, Bcc: Group: value types to include segment order separated by commas within the parentheses.
b. Include new fields S1, S2, S3 . . . Sn in the e-mail body structure to associate text/attachments with each segment. The number of segments of the e-mail would only be limited by OS or hardware limitations.

EXAMPLE III

Method to Merge E-mail Segments Received From a Plurality of Senders Before Replying to the Same With an increase in e-mail usage there is a need to add powerful features to e-mail tools.

Problem:

While receiving e-mail from a host of recipients/senders there is a need to:

1. Merge the responses from all or selected recipients. This is required for a particular e-mail segment so that any subsequent reply can be given considering the responses of all recipients for that particular e-mail segment. This introduces great ease in replying to large number of e-mails especially when they are all related.
2. Reply to all responses by considering all comments for each e-mail segment.

Presently this is done by reading every single mail and replying to every single mail separately. This can become really cumbersome, tiring and time consuming especially if the number of related mails received is in the tune of hundreds or thousands.

Solution, according to this invention:

This invention suggests a method where in:

a. E-mail received from all/selected senders is merged segment wise.
b. The user has a choice to view/read only one mail, which contains the merged contents.
c. The user has a choice to frame one reply after considering the contents/comments sent out by all/selected senders.
d. Upon framing the reply in one mail the user has an option to send the same to all/selected senders. This would mean that all/selected senders would come to know of each of their comments or e-mail contents. This would be a very desirable feature.
e. Upon framing the reply in one mail the user would also have an option to send replies to senders in such a way that only that particular sender's comments and none others are included. This can be established if comments from other senders are irrelevant to each other. This can also be achieved to reduce the e-mail content volume, depending on the need.

One possible implementation of this system uses the following proposed email structure:

| Proposed E-mail body structure: | |
|---|---|
| S1 | Segment 1 contents |
| S2 | Segment 2 contents |
| S3 | Segment 3 contents |
| . | . |
| . | . |
| Sn | Segment n contents |

Description of Headers and Fields in the Above Example

1. The e-mail body structure contains segment contents for each segment.

Consider the case when e-mail is received from 3 users in reply to e-mail sent.

| E-mail body structure of mail from sender1: | |
|---|---|
| S1 | Segment 1 contents from sender1 |
| S2 | Segment 2 contents from sender1 |

| -continued | |
|---|---|
| S3 | Segment 3 contents from sender1 |
| . | . |
| . | . |
| Sn | Segment n contents from sender 1 |
| E-mail body structure of mail from sender2: | |
| S1 | Segment 1 contents from sender2 |
| S2 | Segment 2 contents from sender2 |
| S3 | Segment 3 contents from sender2 |
| . | . |
| . | . |
| Sn | Segment n contents from sender 2 |
| E-mail body structure of mail from sender3: | |
| S1 | Segment 1 contents from sender3 |
| S2 | Segment 2 contents from sender3 |
| S3 | Segment 3 contents from sender3 |
| . | . |
| . | . |
| Sn | Segment n contents from sender 3 |

In the present scenario the user or receiver replies to these individually and separately.

This invention suggests a method using the e-mail body structure described above wherein:

1. Upon receiving e-mail from the senders the user has a choice of selecting e-mails to merge segment wise.
2. Upon selecting the e-mails to merge the e-mail tool merges the e-mail segments in linear sequence segment wise, i.e. the segment1 contents of sender1 followed by segment2 contents of sender2 etc.
3. The user peruses the segment wise contents of the merged e-mail and frames the reply segment wise.
4. Upon framing the reply to each segment of the e-mail the user has the choice of sending
   a. Replies with the embedded contents of all senders.
   b. Replies with the embedded contents of only the particular sender after excluding the embedded contents of the other senders.

To illustrate the above cases consider the following mail:

| S1 | Sender1>"comments received from sender 1" |
|---|---|
| | sender2>"comments received from sender 2" |
| | sender3>"comments received from sender 3" |
| | "Reply from user - 1$^{st}$ Segment" |
| S2 | sender1>"comments received from sender 1" |
| | sender2>"comments received from sender 2" |
| | "Reply from user - 2$^{nd}$ Segment" |
| S3 | sender1>"comments received from sender 1" |
| | sender2>"comments received from sender 2" |
| | sender3>"comments received from sender 3" |
| | "Reply from user - 3$^{rd}$ Segment" |
| . | |
| . | |
| . | |
| Sn | sender1>"comments received from sender 1" |
| | sender2>"comments received from sender 2" |
| | sender3>"comments received from sender 3" |
| | "Reply from user - nth Segment" |

The above mail segment can be sent to all senders. In which case it shall contain the comments from the other senders. This feature is desirable in technical forums and newsgroups.

The above mail segment can be sent to all senders in such a way that what each sender receives is replies without the comments from other senders. The following illustrates the same.

Sender1 would receive:

| | |
|---|---|
| S1 | >"comments received from sender 1"<br>"Reply from user - 1st Segment" |
| S2 | >"comments received from sender 1"<br>"Reply from user - 2nd Segment" |
| S3 | >"comments received from sender 1"<br>"Reply from user - 3rd Segment" |
| . | |
| . | |
| . | |
| Sn | >"comments received from sender 1"<br>"Reply from user - nth Segment" |

Sender2 would receive:

| | |
|---|---|
| S1 | >"comments received from sender 2"<br>"Reply from user - 1st Segment" |
| S2 | >"comments received from sender 2"<br>"Reply from user - 2nd Segment" |
| S3 | >"comments received from sender 2"<br>"Reply from user - 3rd Segment" |
| . | |
| . | |
| . | |
| Sn | >"comments received from sender 2"<br>"Reply from user - nth Segment" |

Sender3 would receive:

| | |
|---|---|
| S1 | >"comments received from sender 3"<br>"Reply from user - 1st Segment" |
| S2 | "Reply from user - 2nd Segment" |
| S3 | >"comments received from sender 3"<br>"Reply from user - 3rd Segment" |
| . | |
| . | |
| . | |
| Sn | >"comments received from sender 3"<br>"Reply from user - nth Segment" |

Note:
In the above reply sent to sender3 the segment S2 contains only the reply and not sender3's comments because sender3 had not sent any in the first place.

These features are not available in current e-mail tools. The e.g. illustrated above is only indicative of a large type of similar requests where the same e-mail contents need to be replied to depending on the comments received from various senders.

This invention fulfills the above mentioned requirements by:

1. Providing a facility wherein e-mail contents can be received segmentwise from a plurality of senders and merged into one document so that our user can reply segment wise. In this process the user can increase the scope of coverage of replies, encompassing all the comments of the senders in his/her reply.
2. the user can choose to send the reply with or without the various contents of the other senders included/embedded in the reply segmentwise.

Following benefits are likely to be accrued:

a. A user can merge 100s of mails segment wise and reply in a concise and all encompassing fashion.
b. The user need not browse, peruse and separately reply to all the related mails that he/she receives. This can be a cumbersome task if the number of mails in the hundreds or thousands.
c. The user has the choice to send the replies to the plurality of senders with or without embedding the comments received from others.
d. Network bandwidth is saved because the net amount of e-mail traffic is reduced due to the accuracy of and all encompassing nature of replies given by the user.
e. A great amount of saving in time and effort occurs due to this effective and easy way of realizing a complex/sophisticated information exchange.

Consider the following table:

| No: of inter-acting users | No: of inter-actions | No: of mails read separately in present scenario | No: of mails read in new scenario utilizing the invention | Remarks |
|---|---|---|---|---|
| 10 | 1 | 9 | 9 | One person sends a mail to 9 others. |
| | 2 | 81 | 10 | The 10 persons reply to 9 others. |
| | 3 | 729 | 10 | The 10 persons reply 9 times to 9 others |
| | 4 | 6561 | 10 | The 10 persons reply 729 times to 9 others |

Implementation Details:

To implement the system, the algorithm of an existing email system can be suitably modified to:

a. Provide for segments within the e-mail body structure.
b. Provide for facility to choose e-mails to be merged segment wise.
c. Provide for facility to include comments from senders to be embedded within segments in a linear sequential manner.
d. Provide a facility wherein the user can specify a choice of whether to include the embedded contents of comments issued by all selected senders while sending out the reply.

These features can easily be implemented using the available development tools.

| Facility | Implementation |
|---|---|
| 1. Ability to select senders/users whose mail needs to be merged | 1. Choose mails using the mouse and specify merge with reply option from the e-mail tool that is similar to the reply with history option. This merge with reply option can be a hotkey or a button. |
| 2. Ability to send cumulative annotated reply to all senders/users | 2. Provide a button or a hotkey. |
| 3. Ability to send annotated reply to all senders/users containing only inclusions from their respective mails. | Provide a button or a hotkey. Internal implementation would take care of parsing e-mail body segment wise and ensure that only that particular user's mail is included.<br>In cases when a new user has to be included only the reply without the other users' annotations are sent. |

This invention is not limited to the above illustrations of the invention.

I claim:

1. In a computing system, a method for restructuring email messages by transmitting selected parts of the message to a plurality of recipients, characterized in that said method comprises the steps of:

identifying selected body segments of an input email message by means of segment identifiers, identifying recipients for each of the selected email message body segments by means of respective segment recipient lists included in respective transmission control directives, parsing said email message to identify the email message body segments, parsing said transmission control directives to identify the lists of recipients for the respective segments, and creating an output email message for each respective list of recipients, wherein such an output email message includes one of the selected input email message body segments for its respective recipient list and excludes other ones of the input email message body segments.

2. A method as claimed in claim 1 wherein at least one of the lists of the recipients includes an alias for the identifying of recipients.

3. A method as claimed in claim 2 wherein such a transmission control directives include a directive for excluding one of the recipients from one of the aliases.

4. In a computing system, a method for restructuring email messages by reordering selected parts of the email message prior to transmitting to a plurality of recipients, characterized in that said method comprises the steps of:

identifying selected segments of an input email message body by means of segment identifiers, providing transmission control directives for the email message, wherein such a transmission control directive includes a recipient list for identifying recipients and a segment ordering list for identifying a defined order of selected ones of the email message body segments, parsing said email message to identify the email message body segments, parsing said transmission control directive to identify the lists of recipients and the ordering of the selected segments, and creating an output email message for each respective list of recipients, wherein such an output email message includes the selected input email message body segments arranged in the order defined by the segment ordering list for its respective recipient list.

5. A method as claimed in claim 4 wherein at least one of the lists of said recipients includes an alias for the identifying recipients.

6. A method as claimed in claim 5 wherein such a transmission control directive includes a directive for excluding one of the recipients from one of the aliases.

7. In a computing system, a method for constructing email messages by a replying user by merging selected parts from a plurality of received email messages, in defined order, prior to transmitting a reply to a plurality of recipients, identified by recipients lists characterized in that said method comprises the steps of:

identifying selected body segments of selected received email messages by means of segment identifiers, wherein the selected email messages are from respective senders, extracting the selected body segments from each email message, merging the selected email body segments into merged output email messages, appending reply contents within the merged email body segments for each output email message, and transmitting the merged output email messages including the reply contents, to the senders, wherein responsive to a first transmission control directive from the replying user such transmitted merged output email message to one of the senders includes all the selected body segments of all the selected received messages and responsive to a second transmission control directive from the replying user such a transmitted merged output email message to one of the senders includes only the selected body segments of the message received from the one sender.

8. A method as claimed in claim 7 wherein said output email message contains merged segments that are reordered in a specified sequence.

9. A method as claimed in claim 7 wherein at least one of the lists of the recipients includes an alias for the identifying of recipients.

10. A method as claimed in claim 7 wherein such a transmission control directive includes a directive for excluding recipients from one of the aliases.

11. An email transmission apparatus configured to transmit email messages to selected recipients and groups of recipients from identified list or lists of recipients, said apparatus having a central processing unit (CPU), associated memory and storage devices and input and output devices, characterized in that it includes:

an inputting mechanism for obtaining from a user: i) identification of selected body segments of an input email message and ii) transmission control directives for the email messages, wherein such a transmission control directive includes recipient lists for respective ones of the selected body segments, a parsing mechanism for identifying the email message body segments and the lists of recipients, a constructing mechanism for constructing an output email message for each respective list of recipients from the input email message based on the identified input email message body segments and lists of recipients, wherein such an output email message includes one of the selected input email message body segments for its respective recipient list and excludes other ones of the input email message body segments.

12. An email transmission apparatus as claimed in claim 11 wherein said constructing mechanism comprises means for generating output email messages by selective combination of identified input email segments based on said transmission control directives and identified segments.

13. An email transmission apparatus configured to transmit email messages to selected recipients and groups of recipients from identified list or lists of recipients, said apparatus having a central processing unit (CPU), associated memory and storage devices and input and output devices, characterized in that it includes:

an inputting mechanism for obtaining from a user: i) identification of selected body segments of an input email message and ii) transmission control directives for the email message, wherein such a transmission control directive includes a recipient list for identifying recipients and a segment ordering list for identifying a defined order of selected ones of the segments, a parsing mechanism for identifying the email message body segments, the recipient lists and the segment ordering list, and a constructing mechanism for constructing an output email message for each respective list of recipients from the input email message based on the identified input email message body segments, recipient lists and segment ordering lists, wherein such an output email message includes the selected input email message body segments ranged in the defined order for its respective recipient list.

14. An email transmission apparatus as claimed in claim 13 wherein said constructing mechanism comprises means for generating output email messages by selective combination of identified input email segments based on said transmission control directives and identified segments, in accordance with rules based on implementation requirements.

15. An email transmission apparatus configured to transmit email messages from a replying user to selected recipients and groups of recipients from identified list or lists of recipients, said apparatus having a central processing unit (CPU), associated memory and storage devices and input and output devices, characterized in that it includes:

an inputting mechanism for obtaining identification of selected email message body segments in selected received email messages, wherein the email messages are from respective senders, an extracting mechanism for extracting the selected segments from each selected email message, a merging mechanism for merging the selected segments into merged output email messages, an appending mechanism for appending reply contents within the merged email segments, a transmitting mechanism for transmitting the merged output email messages, including the reply contents, to the senders, wherein responsive to a first transmission control directive from the replying user such a transmitted merged output email message to one of the senders includes all selected body segments of all the selected received messages and responsive to a second transmission control directive from the replying user such a transmitted merged output email message to one of the senders includes only the selected body segments of the message received from the one sender.

16. An email transmission apparatus as claimed in claim 15 wherein said merging mechanism comprises means for generating output email messages by selective combination of identified input email segments based on said transmission control directives and identified segments.

17. A computer program product comprising a computer usable storage medium having computer readable code embodied therein for causing a computer to transmit email to a plurality of recipients, characterized in that it includes:

computer readable code devices configured to enable obtaining from a user: i) identification of selected body segments of an input email message defined by means of segment identifiers, and ii) transmission control directives, wherein such a transmission control directive includes recipient lists for respective ones of the segments, computer readable code devices for parsing said email message and transmission control directives to identify the input email message body segments and the lists of recipients, computer readable code devices for constructing an output email message for each respective list of recipients from the input email message based on the identified input email message body segments and lists of recipients, wherein such an output email message includes one of the selected input email message body segments for its respective recipient list and excludes other ones of the input email message body segments.

18. A computer program product comprising a computer usable storage medium having computer readable code embodied therein for causing a computer to transmit email to a plurality of recipients, characterized in that it includes:

computer readable code devices configured to enable obtaining from a user: i) identification of selected body segments of an input mail message defined by means of segment identifiers, and ii) transmission control directives for the email message, wherein such a transmission control directive includes a recipient list for identifying recipients and a segment ordering list for identifying a defined order of selected ones of the input email message body segments, computer readable code devices for parsing said email message segments, said recipient lists and said segment ordering lists, computer readable code devices for constructing an output email message for each respective list of recipients based on the identified input email message body segments, recipient lists and segment ordering lists, wherein such an output email message includes the selected input email message body segments arranged in the order defined by the segment ordering list for its respective recipient list.

19. A computer program product comprising a computer usable storage medium having computer readable code embodied therein for causing a computer to transmit email messages from a replying user to a plurality of recipients, characterized in that it includes:

computer readable code devices configured to enable identification of selected email message body segments in selected received email messages, wherein the selected email messages are from respective senders, computer readable code devices for extracting the selected body segments from each email message, computer readable code devices for merging the selected email body segments into merged output email messages, computer readable code devices for appending reply contents within the merged email body segments, computer readable code devices for transmitting the merged output email messages, including the reply contents, to the senders, wherein responsive to a first transmission control directive from the replying user such a transmitted merged output email message to one of the senders includes all the selected body segments of all the selected received messages and responsive to a second transmission control directive from the replying user such a transmitted merged output email message to one of the senders includes only the selected body segments of the message received from the one sender.

* * * * *